(12) United States Patent
Hasegawa

(10) Patent No.: US 8,773,973 B2
(45) Date of Patent: Jul. 8, 2014

(54) RECEIVING APPARATUS AND METHOD

(75) Inventor: Tsuyoshi Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 585 days.

(21) Appl. No.: 13/033,980

(22) Filed: Feb. 24, 2011

(65) Prior Publication Data

US 2011/0216644 A1    Sep. 8, 2011

(30) Foreign Application Priority Data

Mar. 5, 2010 (JP) .................................. 2010-49826

(51) Int. Cl.
*H04B 1/66* (2006.01)

(52) U.S. Cl.
USPC ...................................... 370/210; 375/240.18

(58) Field of Classification Search
USPC .................... 370/203, 210, 329, 334, 343; 375/240.03, 240.19, 240.21, 260
See application file for complete search history.

(56) References Cited

U.S. PATENT DOCUMENTS

| | | | |
|---|---|---|---|
| 7,362,832 B2 | 4/2008 | Yoshida | |
| 2003/0076904 A1* | 4/2003 | Magee | 375/340 |
| 2004/0091057 A1* | 5/2004 | Yoshida | 375/260 |
| 2006/0224651 A1* | 10/2006 | Madhavapeddi et al. | 708/404 |
| 2009/0036135 A1 | 2/2009 | Matsuo et al. | |
| 2009/0213802 A1 | 8/2009 | Miki et al. | |
| 2009/0285263 A1* | 11/2009 | Seller | 375/130 |
| 2010/0027592 A1* | 2/2010 | Arviv et al. | 375/150 |
| 2011/0142146 A1* | 6/2011 | Bae | 375/260 |

FOREIGN PATENT DOCUMENTS

| | | |
|---|---|---|
| JP | 2004-208254 | 7/2004 |
| JP | 2004-235916 | 8/2004 |
| JP | 2007-336496 | 12/2007 |
| WO | 2006/104102 | 10/2006 |

* cited by examiner

*Primary Examiner* — Habte Mered
*Assistant Examiner* — Prince A Mensah
(74) *Attorney, Agent, or Firm* — Katten Muchin Rosenman LLP

(57) ABSTRACT

A receiving apparatus includes a first transform unit configured to perform orthogonal transform on a time-domain input signal and perform saturation when an overflow occurs to transform the input signal into a plurality of frequency-domain signals, a second transform unit configured to perform orthogonal transform on the time-domain input signal while restricting the number of bits during orthogonal transform and continue operations while not performing saturation when at least one of the operations overflows and leaving the operation overflowing to transform the input signal into a plurality of frequency-domain signals, and a bit restricting control unit configured to control the number of bits during orthogonal transform by the second transform unit based on output signals of the first transform unit.

10 Claims, 10 Drawing Sheets

RECEIVING APPARATUS AND METHOD

CROSS-REFERENCE TO RELATED APPLICATIONS

This application is based upon and claims the benefit of priority from the prior Japanese Patent Application No. 2010-49826 filed on Mar. 5, 2010, the entire contents of which are incorporated herein by reference.

FIELD

The embodiments discussed herein relate to a receiving apparatus and method.

BACKGROUND

One of conventionally used transmitting methods for mobile radio communication systems is the orthogonal frequency division multiplexing (OFDM) scheme. The OFDM scheme is used in communication systems, for example, Long Term Evolution (LTE, or Super 3G) and Worldwide Interoperability for Microwave Access (WiMAX). According to the OFDM scheme, a modulated signal is mapped onto the frequency domain and is then converted into a time-domain signal. Fast Fourier transform (FFT) is used to transform a signal between the time domain and the frequency domain. For example, there are receiving apparatuses for performing fast Fourier transform on signals received through a plurality of receiving antennas to transform the received signals for respective subcarriers. One of such receiving apparatuses is an apparatus for detecting a delay-time portion greater than a guard interval of data as an intersymbol interference (ISI) portion, generating a time-waveform portion of a known symbol corresponding to the ISI portion as a replica, subtracting the replica from a received signal, and performing FFT on the result of subtraction to demodulate the data (see, for example, disclosed in Japanese Laid-open Patent Publication No. 2004-208254). Another example of the receiving apparatuses is a receiving apparatus for generating a replica of mutual interference components between systems for each subcarrier, subtracting the replica from each of received signals of the systems subjected to fast Fourier transform to cancel the mutual interference components between the systems included in the received signal (see, for example, disclosed in Japanese Laid-open Patent Publication No. 2004-235916).

In such a conventional receiving apparatus, when received signals are subjected to fast Fourier transform, a difference in average power between subcarriers subjected to the transform occurs in some cases. For example, when the received power of subcarriers allocated to a distant terminal is higher than that of subcarriers allocated to a nearby terminal, the difference in average power between subcarriers subjected to fast Fourier transform may occur. In this case, an overflow occurs in a subcarrier having high power after fast Fourier transform unless a sufficient number of bits is used in fast Fourier transform or a high level diagram is designed. If an overflow occurs, an error may be reduced by saturation. Accordingly, saturation is usually performed in operations for radio communication.

As for the subcarrier having high power, the level of an input signal to be subjected to fast Fourier transform is controlled so that the occurrence of overflow may be prevented. In this case, the number of allocated bits may be reduced in the subcarrier having low power, so that the accuracy of fast Fourier transform is lowered. To yield sufficient accuracy on the subcarrier having low power, the number of bits necessary for fast Fourier transform has to be increased. The code division multiple access (CDMA) scheme, one of the transmitting methods for the mobile radio communication systems, uses fast Hadamard transform (FHT) instead of fast Fourier transform. Fast Hadamard transform has the same problem as that described above.

SUMMARY

According to an aspect of the invention, a receiving apparatus includes a first transform unit configured to perform orthogonal transform on a time-domain input signal and perform saturation when an overflow occurs to transform the input signal into a plurality of frequency-domain signals, a second transform unit configured to perform orthogonal transform on the time-domain input signal while restricting the number of bits during orthogonal transform and continue operations while not performing saturation when at least one of the operations overflows and leaving the operation overflowing to transform the input signal into a plurality of frequency-domain signals, and a bit restricting control unit configured to control the number of bits during orthogonal transform by the second transform unit based on output signals of the first transform unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
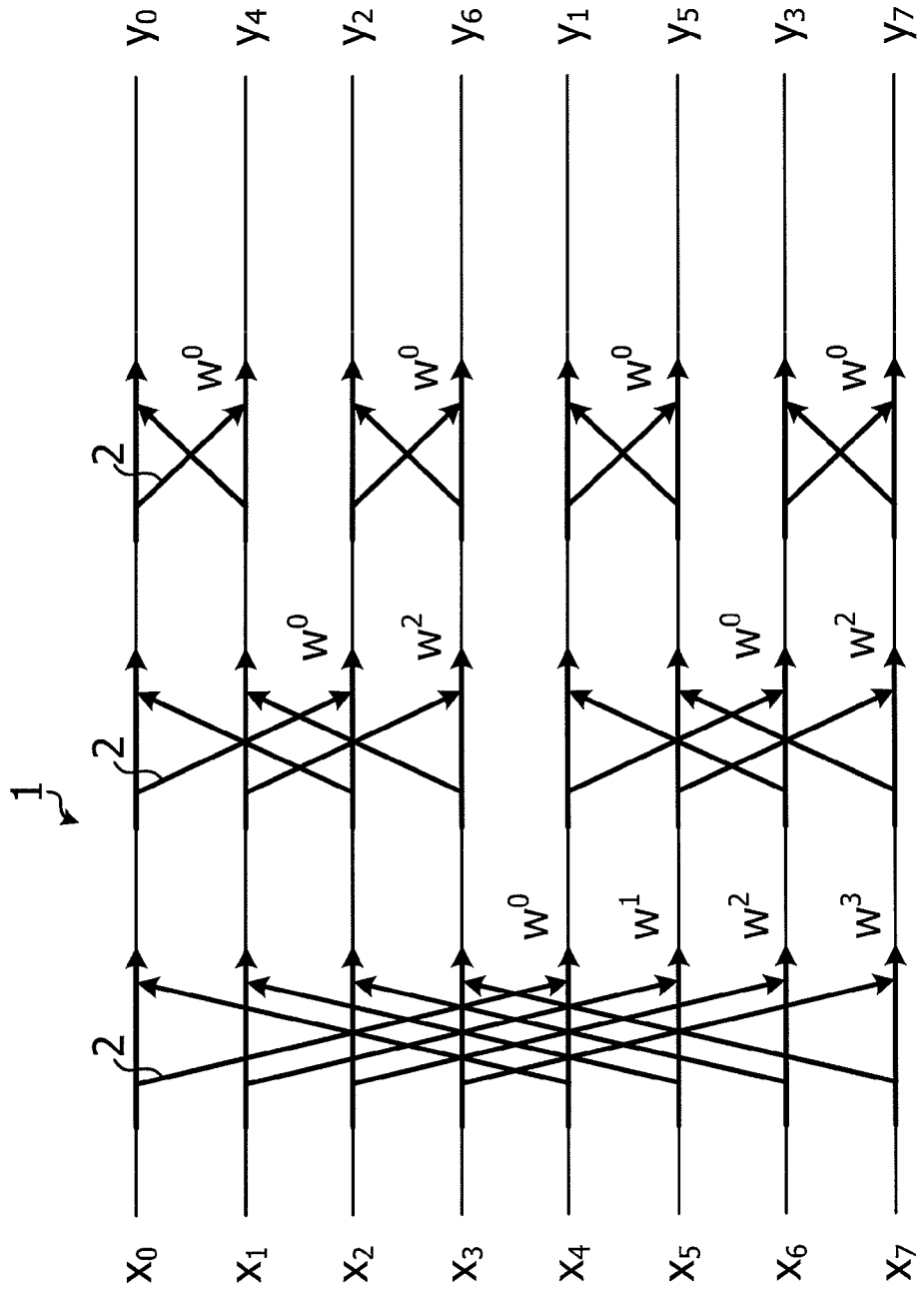
FIG. 1 is a schematic diagram illustrating a fast Fourier transform circuit.

Receiving apparatuses and methods according to preferred embodiments will be described below with reference to the accompanying drawings. In the following description of the embodiments, the same components are designated by the same reference numerals to avoid overlapping explanation.

FIG. 1 is a schematic diagram illustrating a decimation-in-frequency fast Fourier transform circuit. FIG. 1 illustrates the fast Fourier transform circuit, indicated at 1, for performing a fast Fourier transform operation in which the number of elements is 8 and the base is 2. Other numbers may be used as the number of elements and the base. Referring to FIG. 1, cross-multiplication structures indicated by arrows correspond to butterfly operation circuits 2, each serving as a basic part of the fast Fourier transform operation. Twiddle factors $w^0$ to $w^3$ are multiplied with input signals of the butterfly operation circuits 2. Output signals of each butterfly operation circuit 2 become input signals of the next butterfly operation circuit 2. Generally, when the number of elements is $2^N$, a signal passes the butterfly operation circuits N times. Accordingly, when the number of elements is 8, each input signal passes the butterfly operation circuits three times.

Figure 2:
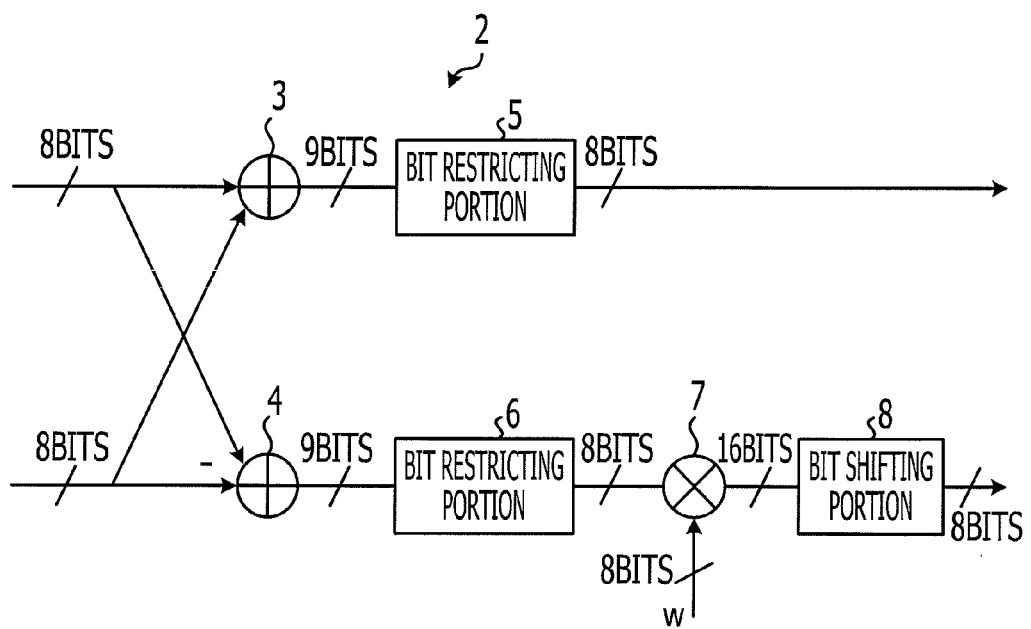
FIG. 2 is a block diagram illustrating a butterfly operation circuit.

FIG. 2 is a block diagram illustrating the butterfly operation circuit 2. It is assumed that an input signal and a twiddle factor each include eight bits in a circuit for performing a butterfly operation using an integer as the finite number of bits. Referring to FIG. 2, in each butterfly operation circuit 2, an adding portion 3 adds an input signal (eight bits) to another input signal (eight bits). A subtracting portion 4 subtracts an input signal (eight bits) from another input signal (eight bits). Bit restricting portions 5 and 6 process an output signal (nine bits) of the adding portion 3 and an output signal (nine bits) of the subtracting portion 4 to remove one high-order or low-order bit of each output signal, respectively, such that each output signal includes eight bits equal in number to that of the input signal. The signal, output from the adding portion 3 and processed as an 8-bit signal by the bit restricting portion 5, serves as an output signal of the butterfly operation circuit 2.

The signal, output from the subtracting portion 4 and processed as an 8-bit signal by the bit restricting portion 6, is multiplied by a twiddle factor w (eight bits) in a multiplying portion 7. The eight low-order bits of a 16-bit signal, obtained as the product of multiplication, are removed in a bit shifting portion 8 so that the signal includes eight bits equal in number to that of the input signal. An output signal (eight bits) of the bit shifting portion 8 serves as another output signal of the butterfly operation circuit 2. The addition and subtraction by the adding portion 3 and the subtracting portion 4 allow the amplitudes of signals to be $\sqrt{2}$ times on average. Accordingly, for example, when one low-order bit is removed from each of the output signal of the adding portion 3 and that of the subtracting portion 4 one out of every two times when the input signal passes the butterfly operation circuits 2 in the fast Fourier transform circuit 1, the amplitude returns. It is therefore preferable. The number of bits to be removed in the bit shifting portion 8 and the frequency of removing bits by the bit restricting portions 5 and 6 may be appropriately changed based on an input signal.

First Embodiment

A first embodiment relates to a receiving apparatus that performs orthogonal transform on a time-domain input signal while restricting the number of bits during orthogonal transform and while not performing saturation when an overflow occurs to transform the signal into a plurality of frequency-domain signals. Examples of orthogonal transform include fast Fourier transform and fast Hadamard transform. In this embodiment, a case using fast Fourier transform will be described.

Figure 3:
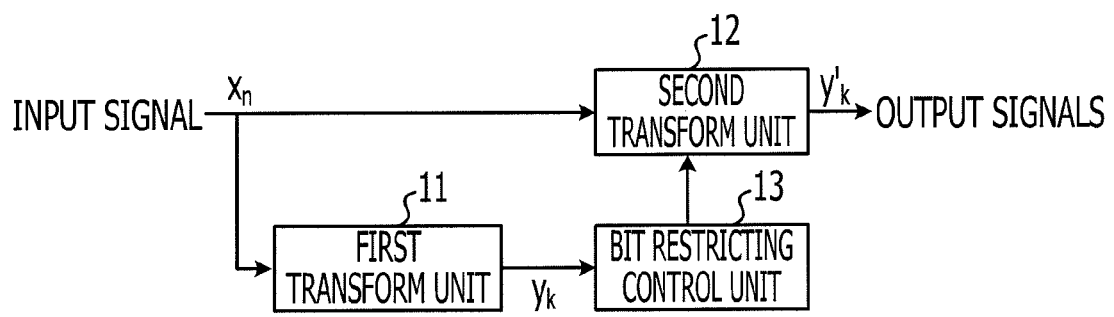
FIG. 3 is a block diagram illustrating a receiving apparatus according to a first embodiment.

FIG. 3 is a block diagram illustrating the receiving apparatus according to the first embodiment. Referring to FIG. 3, the receiving apparatus includes a first transform unit 11, a second transform unit 12, and a bit restricting control unit 13. An input signal $x_n$ is stored in a memory, such as a buffer, which is not illustrated. The input signal $x_n$ is controlled by, for example, an automatic gain control (AGC) circuit (not illustrated) so that a signal level in a desired band is set to an appropriate level. The input signal $x_n$ is a signal according to a multicarrier transmission scheme. Examples of the multicarrier transmission scheme include, for example, the OFDM scheme and the CMDA scheme. In this embodiment, the OFDM scheme will be described.

The first transform unit 11 performs fast Fourier transform on an input signal $x_n$ in the time domain to output a plurality of frequency-domain signals $y_k$. Each frequency-domain signal is called a subcarrier. The first transform unit 11 performs saturation when an overflow occurs during fast Fourier transform. The saturation allows a result of overflowing operation to be fixed to a predetermined value, for example, a maximum value.

The bit restricting control unit 13 checks on the amplitude of a desired-band signal of the output signals $y_k$ of the first transform unit 11. The bit restricting control unit 13 determines a bit restricting parameter for the second transform unit 12 based on the result of checking on the amplitude of the desired-band signal. The bit restricting parameter is a parameter that determines the above-described frequency of bit removing, for example, one low-order bit of a signal subjected to addition and subtraction, namely, one out of every how many butterfly operations in the second transform unit 12. The bit restricting control unit 13 determines the bit restricting parameter for the second transform unit 12 so that the result of fast Fourier transform on a desired-band signal has a value that is high enough not to cause overflow.

For example, it is assumed that the amplitude of a desired-band signal at a certain time point is ⅛ or less than ⅛ the maximum amplitude of a signal of the output signals $y_k$ of the first transform unit 11. In this case, the bit restricting control unit 13 determines the bit restricting parameter for the second transform unit 12 so that the number of times one low-order bit is removed in the second transform unit 12 is less than that at that time point by an amount ranging from one to three times, for example. For example, when the number of times one low-order bit is removed is reduced by one time, the amplitude of a desired-band signal is substantially doubled. When the number of times one low-order bit is removed is reduced by two times, the amplitude of the desired-band signal is increased by substantially four times. When the number of times one low-order bit is removed is reduced by three times, the amplitude thereof is increased by substantially eight times. Accordingly, an effectively large number of bits may be allocated to the desired-band signal.

The second transform unit 12 includes a decimation-in-frequency fast Fourier transform circuit, for example, as illustrated in FIG. 1. The second transform unit 12 performs fast Fourier transform on the time-domain input signal $x_n$ to output a plurality of output signals $y'_k$. The second transform unit 12 performs fast Fourier transform while removing, for example, low-order bits of signals subjected to addition and subtraction in butterfly operations based on the bit restricting parameter determined by the bit restricting control unit 13. The output signals $y'_k$ of the second transform unit 12 are output as results of fast Fourier transform on the input signal to a circuit at the next stage (not illustrated).

For example, in the decimation-in-frequency fast Fourier transform circuit as illustrated in FIG. 1, the twiddle factors $w^0$ and $w^2$ are used for butterfly operations at the second stage from the last stage. Since each of the twiddle factors $w^0$ and $w^2$ is an integer multiple of 90 degrees, a result obtained by multiplying an input signal of the multiplying portion 7 by the twiddle factor w is the same as a signal obtained by inverting the sign of the input signal of the multiplying portion 7, alternatively, a signal obtained by changing the real part of the input signal of the multiplying portion 7 for the imaginary part thereof. In other words, butterfly operations at the second stage from the last stage include addition and subtraction and substantially include no multiplication. Therefore, addition and subtraction in two's complement notation are performed as will be described below.

Consideration will now be given to addition and subtraction in two's complement notation in the finite number of bits. It is assumed that many additions and subtractions are performed using an 8-bit integer ranging, for example, from −128 to 127 and the finally obtained value ranges from −128 to 127. In this case, an overflow may occur during calculation. Even if the overflow has occurred, the result of calculation is a value obtained by folding between −128 and 127. For example, assuming that a value obtained by addition and subtraction before folding is 200, −56 (=200−256) is a value obtained by folding 200 between −128 and 127. As described above, so long as it is found that the resultant value lies in the range of −128 to 127, if an overflow occurs during calculation, the resultant value is correct.

For example, in the decimation-in-frequency fast Fourier transform circuit as illustrated in FIG. 1, addition and subtraction in two's complement notation are performed in each butterfly operation at the second stage from the last stage, as described above. A portion where saturation may be omitted corresponds to a portion where a twiddle factor whose value is an integer multiple of 90 degrees continues to the last. As for butterfly operations at the third stage from the last stage, the twiddle factors $w^1$ and $w^3$ are not integer multiples of 90 degrees. Accordingly, the second transform unit 12 does not perform saturation in the butterfly operations at the second stage from the last stage even if an overflow occurs. The second transform unit 12 may perform saturation during butterfly operations at the third stage from the last stage when an overflow occurs. As described above, the second transform unit 12 may perform saturation in some of butterfly operations based on the values of twiddle factors for the butterfly operations and may omit saturation in some of the butterfly operations.

When the amplitudes of the desired-band signals of the input signals $x_n$ are small on average, an overflow occurs during operation in part of large-amplitude bands. Accordingly, large folding noise may be mixed into a subcarrier on which the overflow has occurred. However, an overflow is prevented on signals in the desired band because the bit restricting parameter is set so as to prevent the overflow as described above. Thus, the correct result of fast Fourier transform is obtained. Since the second transform unit 12 does not perform saturation, any overflow may not be detected. Therefore, the first transform unit 11 performs saturation during fast Fourier transform, thereby confirming that an overflow does not occur on desired-band signals.

Figure 4:
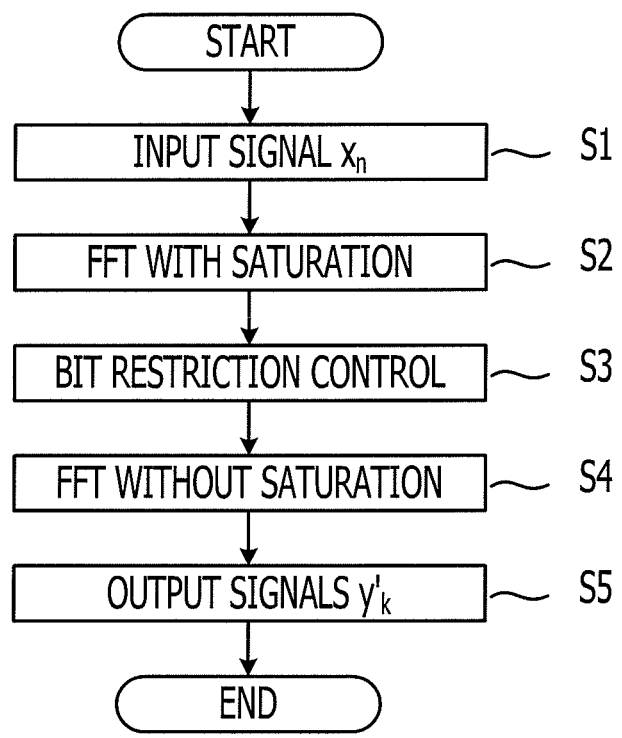
FIG. 4 is a flowchart illustrating a receiving method according to the first embodiment.

FIG. 4 is a flowchart illustrating a receiving method according to the first embodiment. Referring to FIG. 4, when orthogonal transform on a received signal is started, the receiving apparatus receives a time-domain input signal $x_n$, serving as the received signal, and stores the signal into a memory, such as a buffer (operation S1). Subsequently, the receiving apparatus allows the first transform unit 11 to perform fast Fourier transform on the input signal $x_n$ while performing saturation to transform the input signal into a plurality of frequency-domain signals $y_k$ (operation S2). The receiving apparatus may perform fast Fourier transform by the first transform unit 11 each time or intermittently, as will be described later. Next, the receiving apparatus allows the bit restricting control unit 13 to determine a bit restricting parameter for the second transform unit 12 based on the amplitude of a desired-band signal. Specifically, the receiving apparatus controls bit restriction on the second transform unit 12 (operation S3). The receiving apparatus then allows the second transform unit 12 to perform fast Fourier transform on the input signal $x_n$ without performing saturation in some of butterfly operations to transform the input signal into a plurality of frequency-domain signals $y'_k$ (operation S4). After that, the receiving apparatus allows the second transform unit 12 to output the signals $y'_k$ to the next-stage circuit (operation S5). A series of orthogonal transform processes terminates.

For example, it is assumed that a carrier frequency is 2 GHz and a terminal moves at a speed of 120 km/h. In this case, the maximum Doppler frequency is 222 Hz and the period is 4.5 ms. One of mobile radio communication systems using the OFDM scheme is Long Term Evolution (LTE). The standardization of LTE is being promoted by the 3rd Generation Partnership Project (3GPP), serving as a standards body of the third-generation mobile phone system. The OFDM symbol length in LTE is 0.083 ms, which is much shorter than 4.5 ms described above. In the case of LTE, therefore, the first transform unit 11 may confirm that an overflow does not occur on desired-band signals approximately one out of every several symbols. Specifically, the first transform unit 11 may intermittently perform fast Fourier transform. The traveling speed of a terminal is often lower than 120 km/h. When the traveling speed of the terminal is lower than 120 km/h, the frequency of performing fast Fourier transform by the first transform unit 11 may be further reduced.

Figure 5:
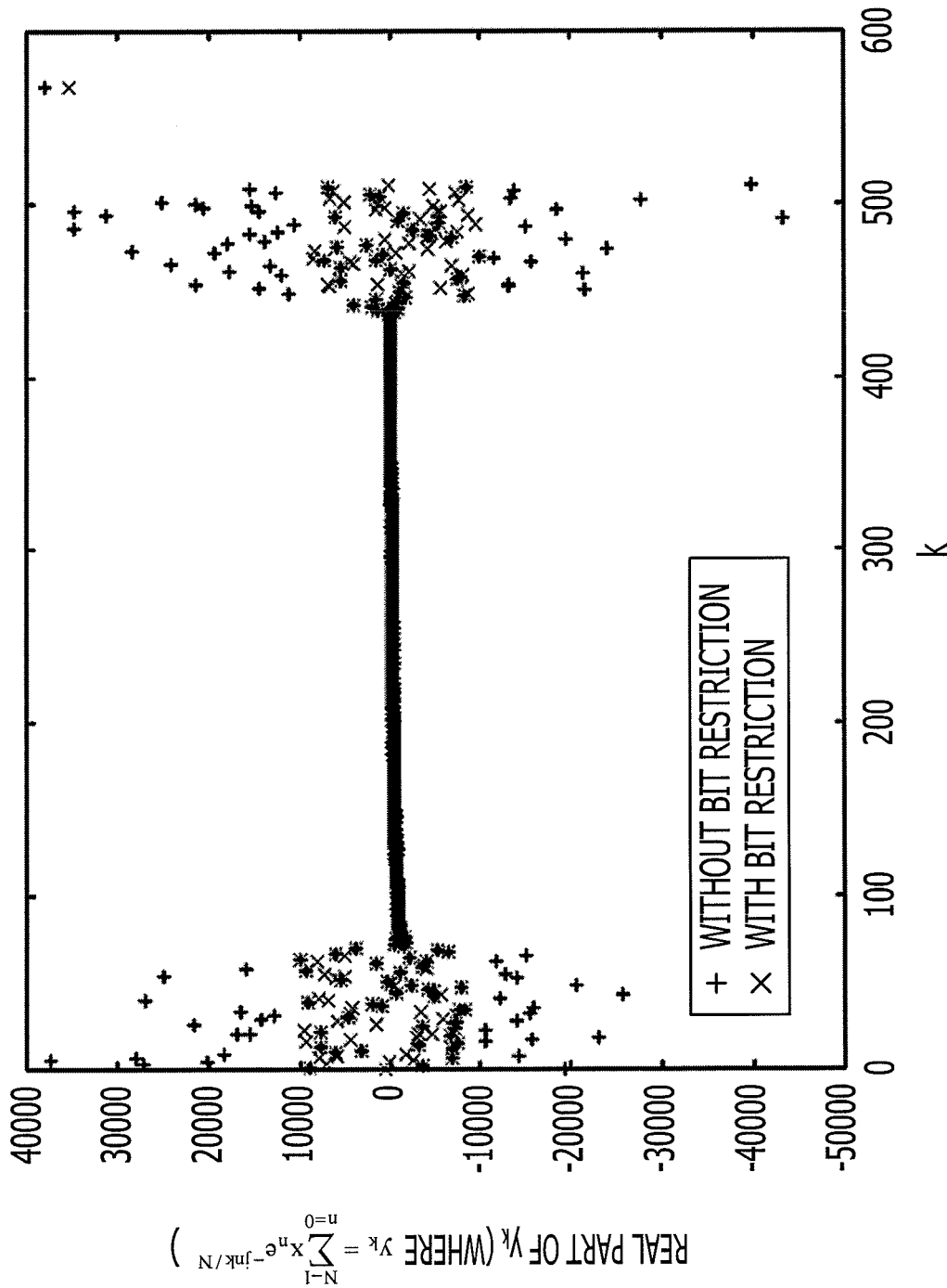
FIG. 5 is a characteristic diagram illustrating simulations of fast Fourier transform without saturation.

FIG. 5 is a characteristic diagram illustrating simulations of fast Fourier transform without saturation. A fast Fourier transform operation is equivalent to transform of a complex number $x_n$ (n is an integer ranging from 0 to N−1) of the number of elements N into $y_k$ (k is an integer ranging from 0 to N−1) using the following expression. In FIG. 5, the ordinate axis indicates the value of real part of $y_k$ and the abscissa axis indicates the index k. Although the indices n and k are essentially dimensionless numbers, the index n often corresponds to discrete time and the index k often corresponds to discrete frequency. FIG. 5 is the characteristic diagram illustrating the value of real part of $y_k$ plotted against k when N=512. In FIG. 5, each plot "×" indicates partial overflow by the above-described bit restriction in the second transform unit 12 and each plot "+" indicates a case without bit restriction.

$$Y_K = \sum_{N=0}^{N-1} X_n e^{-jnk/N} \qquad (1)$$

As is clear from FIG. 5, when bit restriction was performed, overflows occurred in a large-amplitude area where the value of k is several tens or less and in a large-amplitude area where the value of k is four hundreds and several tens or more, but a state in a small-amplitude area between the large-amplitude areas is the same as a case where any overflow does not occur. Therefore, it was confirmed that even when the number of bits is reduced by bit restriction during fast Fourier transform, the correct result of operation may be obtained in the small-amplitude area. In the case illustrated in FIG. 5, the bit restriction caused the value of real part of $y_k$ to be approximately ¼ the maximum value. Consequently, saving by two bits may be achieved.

According to the first embodiment, in the case where the receiving apparatus performs fast Fourier transform on a signal having a small amplitude, even if an overflow occurs, the correct result of operation may be obtained. Accordingly, sufficiently high accuracy may be achieved without increasing the number of bits during fast Fourier transform. Therefore, the number of bits used for fast Fourier transform may be reduced as compared with a case where high accuracy is obtained by increasing the number of bits.

Figure 6:
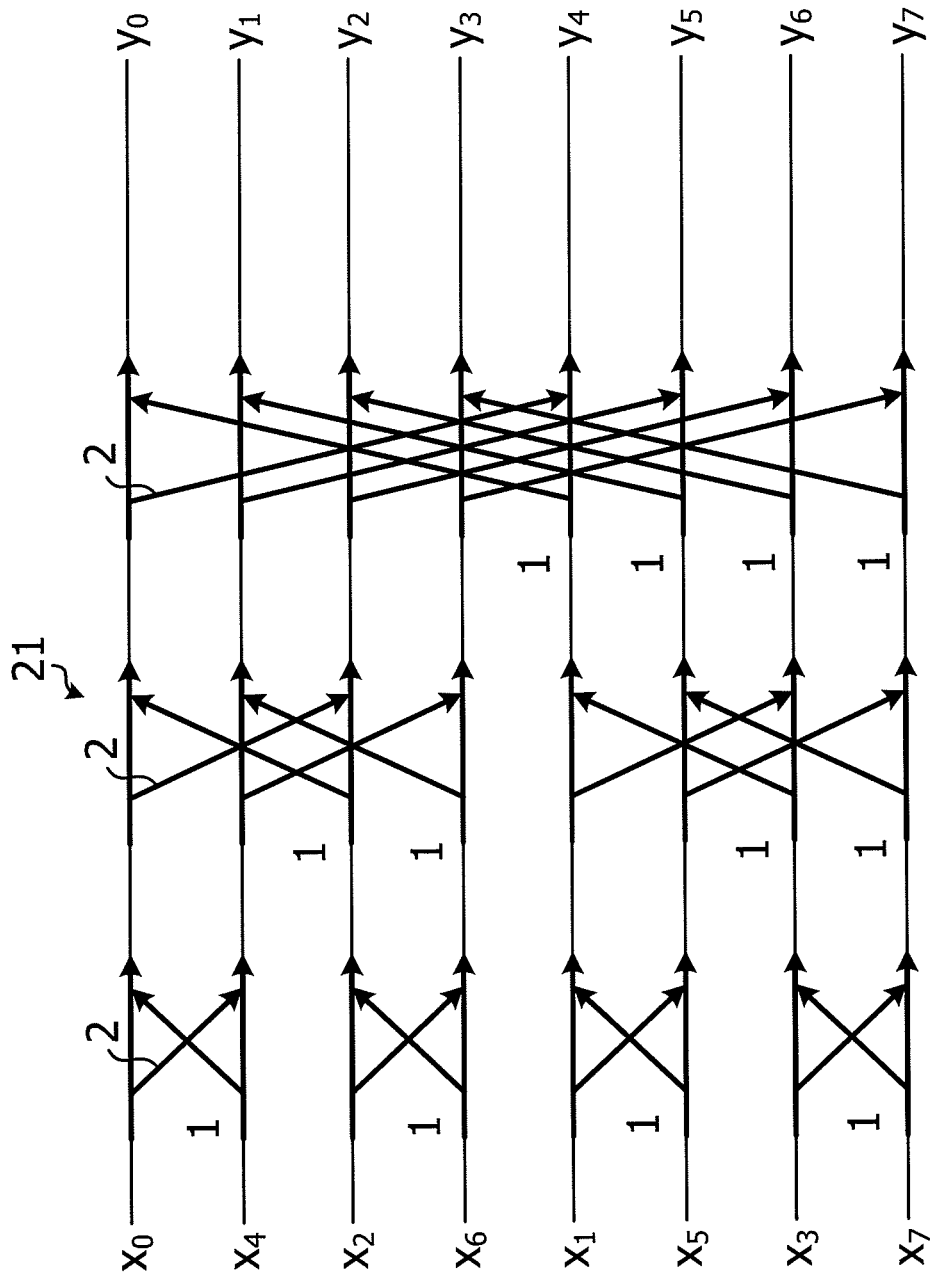
FIG. 6 is a schematic diagram illustrating a fast Hadamard transform circuit.

The first transform unit 11 and the second transform unit 12 may be configured to perform fast Hadamard transform. FIG. 6 illustrates a circuit that performs fast Hadamard transform operation in which, for example, the number of elements is 8 and the base is 2. Referring to FIG. 6, a fast Hadamard transform circuit 21 is equivalent to a fast Fourier transform circuit in which all of twiddle factors is set to 1. Accordingly, when the receiving apparatus performs fast Hadamard transform according to, for example, the CDMA scheme, the same advantages as those in the case using the above-described fast Fourier transform may be obtained. In the fast Hadamard transform circuit 21, each butterfly operation circuit 2 substantially includes no multiplication and performs only addition and subtraction. Addition and subtraction in the above-described two's complement notation are performed. Therefore, the second transform unit 12 may perform all of butterfly operations 2 without saturation.

Second Embodiment

A second embodiment relates to a case where when twiddle factors are not integer multiples of 90 degrees, the receiving apparatus according to the first embodiment increases the number of bits as compared with the case where the twiddle factors are integer multiples of 90 degrees and performs butterfly operations. Specifically, for example, in the fast Fourier transform circuit 1 illustrated in FIG. 1, the butterfly operations for multiplication using the twiddle factors $w^1$ and $w^3$ at the third stage from the last stage are performed in a circuit having a configuration illustrated in FIG. 7. Such a butterfly operation will be called "bit-number-increased butterfly operation" hereinafter. In the fast Fourier transform circuit 1 in FIG. 1, the other butterfly operations are performed in the circuit having the configuration illustrated in FIG. 2. Such a butterfly operation will be called "normal-bit-number butterfly operation" hereinafter.

Figure 7:
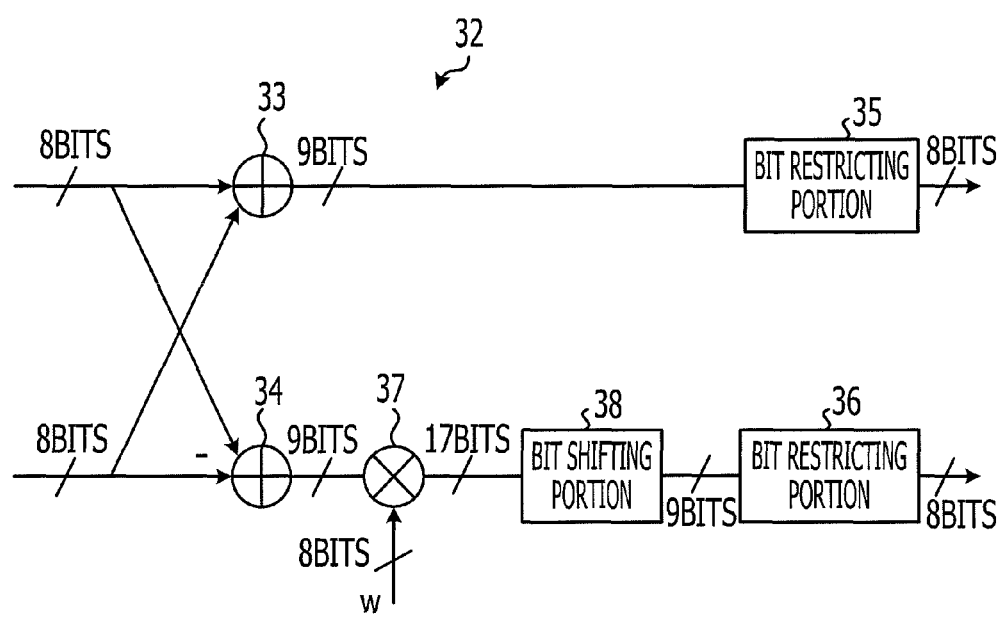
FIG. 7 is a block diagram illustrating a butterfly operation circuit in a receiving apparatus according to a second embodiment.

FIG. 7 is a block diagram illustrating a bit-number-increased butterfly operation circuit. An example will be described with respect to a case where an input signal and a twiddle factor each include eight bits in the circuit performing a butterfly operation using an integer as the finite number of bits. Referring to FIG. 7, in the bit-number-increased butterfly operation circuit, indicated at 32, an adding portion 33 adds one input signal (eight bits) to another input signal (eight bits). A subtracting portion 34 subtracts one input signal (eight bits) from another input signal (eight bits). A bit restricting portion 35 removes one high-order or low-order bit of an output signal (nine bits) of the adding portion 33. The resultant signal serves as one output signal (eight bits) of the bit-number-increased butterfly operation circuit 32.

A multiplying portion 37 multiplies an output signal (nine bits) of the subtracting portion 34 by a twiddle factor w (eight bits). In the normal-bit-number butterfly operation circuit 2 illustrated in FIG. 2, an input signal of the multiplying portion 7 includes eight bits. On the other hand, in the bit-number-increased butterfly operation circuit 32, an input signal of the multiplying portion 37 includes nine bits. Accordingly, a signal with overflowing bits may be prevented from being supplied to the multiplying portion. As for a signal, including 17 bits, obtained as the product of multiplication, the eight low-order bits of the signal are removed in a bit shifting portion 38, so that the signal includes nine bits. One high-order or low-order bit of an output signal (nine bits) of the bit shifting portion 38 is removed in a bit restricting portion 36 and the resultant signal serves as another output signal (eight bits) of the bit-number-increased butterfly operation circuit 32. The number of bits to be removed in the bit shifting portion 38 and the frequency of removing bits in each of the bit restricting portions 35 and 36 are appropriately changed based on an input signal. The other components are the same as those in the first embodiment.

Figure 8:
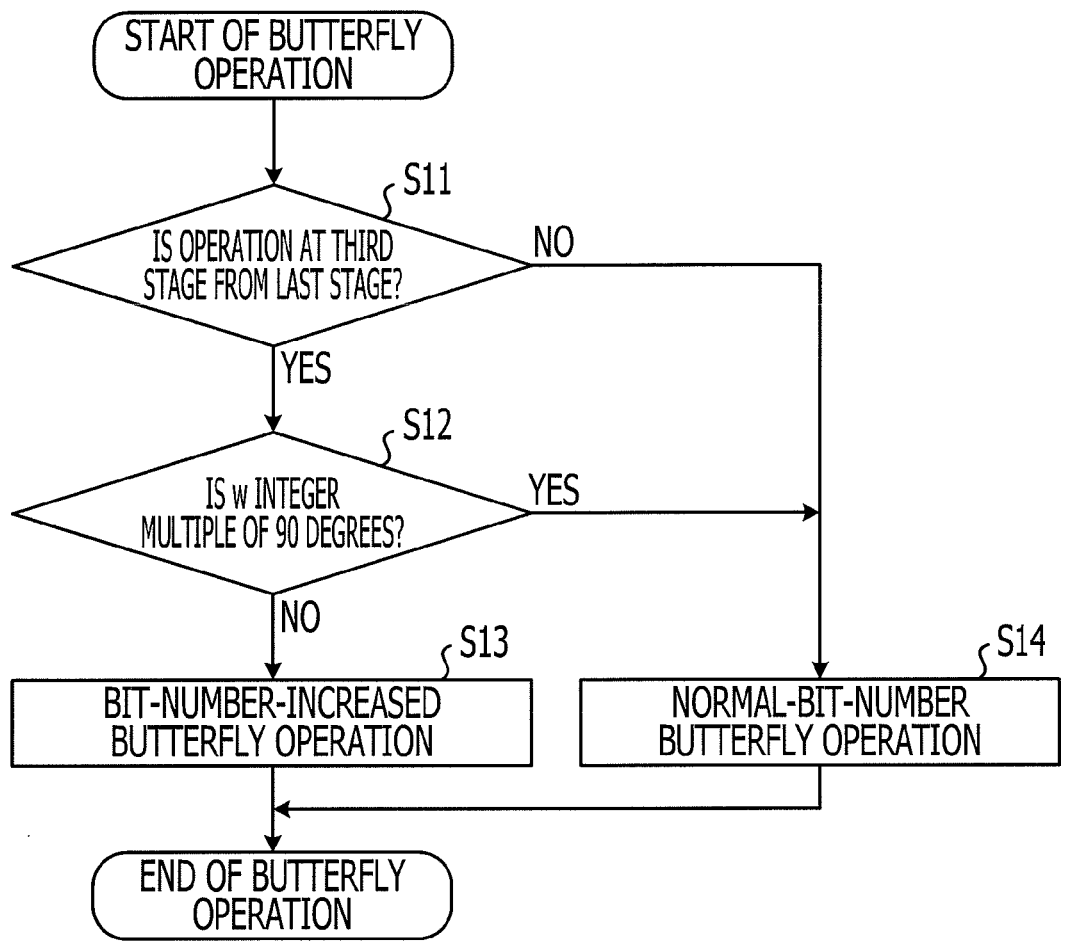
FIG. 8 is a flowchart illustrating butterfly operation processing in a receiving method according to the second embodiment.

FIG. 8 is a flowchart illustrating butterfly operation processing in a receiving method according to the second embodiment. This butterfly operation processing is performed in operation S4 in the flowchart of FIG. 4. When a butterfly operation is started, the receiving apparatus determines whether the butterfly operation performed by the second transform unit 12 is a butterfly operation at the third stage from the last stage (operation S11). If it is at the third stage from the last stage (YES in operation S11), the receiving apparatus determines whether the twiddle factor w in the butterfly operation by the second transform unit 12 is an integer multiple of 90 degrees (operation S12). If it is not an integer multiple of 90 degrees (NO in operation S12), the receiving apparatus allows the second transform unit 12 to perform the bit-number-increased butterfly operation (operation S13). The butterfly operation processing terminates. Whereas, if the butterfly operation is not that at the third stage from the last stage (NO in operation S11), alternatively, if the twiddle factor w is an integer multiple of 90 degrees (YES in operation S12), the receiving apparatus allows the second transform unit 12 to perform the normal-bit-number butterfly operation (operation S14). The butterfly operation processing terminates.

According to the second embodiment, the same advantages as those in the first embodiment are obtained. In a case where the above-described processing is performed using the firmware of a digital signal processor (DSP), when a multiplier of the DSP allows eight bits, multiplication on nine bits is performed while the multiplier is used many times. Therefore, the number of operations may be significantly increased. According to the second embodiment, since the number of bits used upon multiplication is increased in only some of butterfly operations, the increase of the number of operations may be remarkably reduced.

Third Embodiment

A third embodiment relates to a case where the amplitude of a signal output from the second transform unit 12 to the next-stage circuit is controlled in the receiving apparatus according to the first or second embodiment.

Figure 9:
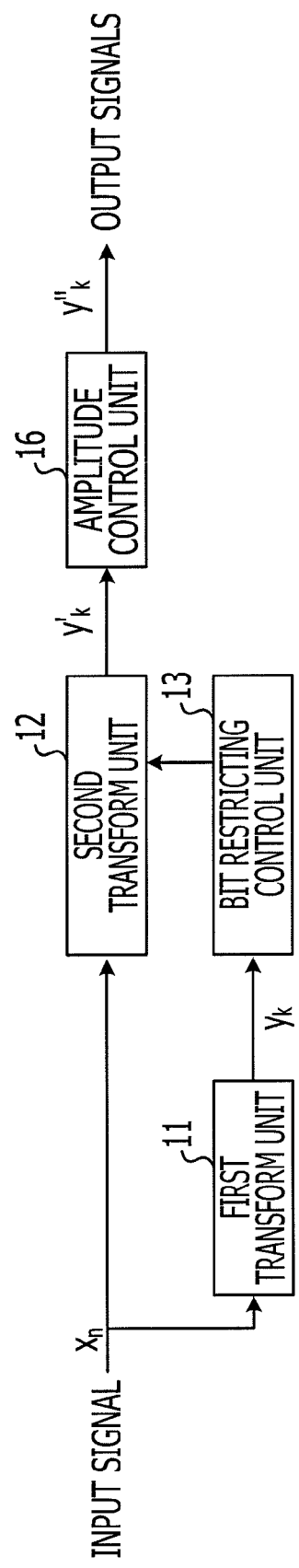
FIG. 9 is a block diagram illustrating a receiving apparatus according to a third embodiment.

FIG. 9 is a block diagram illustrating a receiving apparatus according to the third embodiment. Referring to FIG. 9, the receiving apparatus includes an amplitude control unit 16 in addition to the components in the first or second embodiment. The amplitude control unit 16 multiplies each output signal $y'_k$ of the second transform unit 12 by a constant to generate an output signal $y''_k$ to be supplied to the next-stage circuit. In the amplitude control unit 16, the constant by which the signal $y'_k$ is multiplied is determined based on a bit restriction parameter for the second transform unit 12 determined by the bit restricting control unit 13. For example, when the number of times one low-order bit is removed by the second transform unit 12 based on the bit restriction parameter is lower by three times than that one low-order bit is removed by the first transform unit 11, the amplitude control unit 16 reduces the amplitude of the output signal $y'_k$ of the second transform unit 12 by ⅛ times. The other components are the same as those in the first or second embodiment.

Figure 10:
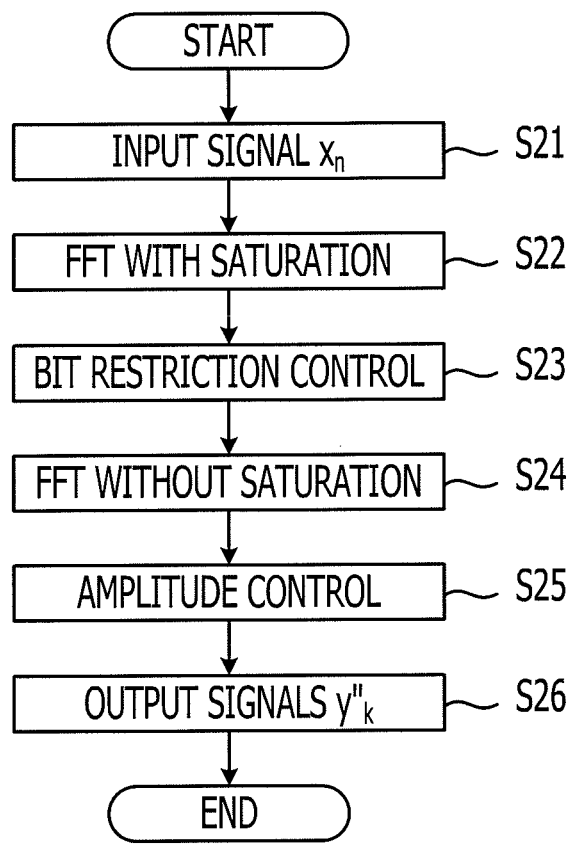
FIG. 10 is a flowchart illustrating a receiving method according to the third embodiment.

FIG. 10 is a flowchart illustrating a receiving method according to the third embodiment. Referring to FIG. 10, when orthogonal transform processing on a received signal is started, the receiving apparatus performs the same operations as the operations S1 to S4 in the first embodiment (operations S21 to S24). Subsequently, the receiving apparatus allows the amplitude control unit 16 to multiply each output signal $y'_k$ of the second transform unit 12 to control the amplitude of the output signal (operation S25). The receiving apparatus allows the amplitude control unit 16 to output each signal $y''_k$ to the next-stage circuit (operation S26). A series of orthogonal transform processes terminates.

According to the third embodiment, the same advantages as those obtained in the first or second embodiment are obtained. In addition, when the receiving apparatus obtains the likelihood of each bit of a symbol of 16 QAM or 64 QAM in the next-stage circuit, bit determination may be performed with accuracy. Advantageously, demodulation and decoding may be normally performed in the next-stage circuit.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that various changes, substitutions, and alterations could be made hereto without departing from the spirit and scope of the invention.

The invention claimed is:

1. A receiving apparatus comprising:
a memory; and
a processor coupled to the memory and configured to:
perform a first orthogonal transform directly on a time-domain input signal, while performing saturation when an overflow occurs during the first orthogonal transform, to transform the time-domain input signal into a plurality of the first frequency-domain signals,
perform a second orthogonal transform on the time-domain input signal itself, while restricting a number of bits during the second orthogonal transform, and while continuing operations of the second orthogonal transform without performing saturation in at least one of the operations when the at least one of the operations overflows, to transform the time-domain input signal into a plurality of second frequency-domain signals, and
control the number of bits based on the plurality of first frequency-domain signals.

2. The apparatus according to claim 1, wherein the processor performs a fast Fourier transform as each of the first and second orthogonal transforms.

3. The apparatus according to claim 2, wherein the processor does not perform saturation in at least one of butterfly operations of the fast Fourier transform, the at least one butterfly operation using a twiddle factor whose value is an integer multiple of 90 degrees, and performs saturation in other butterfly operations using a twiddle factor whose value is not an integer multiple of 90 degrees.

4. The apparatus according to claim 2, wherein the processor sets the number of bits used upon multiplication by a twiddle factor whose value is not an integer multiple of 90 degrees in butterfly operations of the fast Fourier transform to be greater than that used upon multiplication by a twiddle factor whose value is an integer multiple of 90 degrees.

5. The apparatus according to claim 1, wherein the processor performs a fast Hadamard transform as each of the first and second orthogonal transforms.

6. A receiving method performed by a receiving apparatus, comprising:
performing a first orthogonal transform on a time-domain input signal, while performing saturation when an overflow occurs during the first orthogonal transform, to transform the time-domain input signal into a plurality of first frequency-domain signals;
controlling a number of bits during a second orthogonal transform based on the plurality of the first frequency-domain signals; and
performing, by a processor of the receiving apparatus, the second orthogonal transform on the time-domain input signal, itself while restricting the number of bits during the second orthogonal transform based on a result of the controlling, and while continuing operations of the second orthogonal transform without performing saturation in at least one of the operations when the at least one of the operations overflows, to transform the time-domain input signal into a plurality of second frequency-domain signals.

7. The method according to claim 6, wherein a fast Fourier transform is performed as each of the first and second orthogonal transforms.

8. The method according to claim 7, wherein saturation is not performed in at least one of butterfly operations of the fast Fourier transform, the at least one butterfly operation using a twiddle factor whose value is an integer multiple of 90 degrees, and saturation is performed in other butterfly operations using a twiddle factor whose value is not an integer multiple of 90 degrees.

9. The method according to claim 7, wherein the number of bits used upon multiplication by a twiddle factor whose value is not an integer multiple of 90 degrees in butterfly operations of the fast Fourier transform is set to be greater than that used upon multiplication by a twiddle factor whose value is an integer multiple of 90 degrees.

10. The method according to claim 6, wherein a fast Hadamard transform is performed as each of the first and second orthogonal transforms.

* * * * *